United States Patent [19]
Silver

[11] Patent Number: 6,064,307
[45] Date of Patent: May 16, 2000

[54] METHOD FOR RELATING INFORMATION ABOUT AN ARTICLE TO A FINDER OF THE ARTICLE

[75] Inventor: Ronald B. Silver, Vancouver, Wash.

[73] Assignee: John P. Herres, Jr., Vancouver, Wash.

[21] Appl. No.: 08/626,775

[22] Filed: Apr. 2, 1996

[51] Int. Cl.[7] .......................... G08B 21/04; G08B 21/00; G08B 25/00

[52] U.S. Cl. .......................... 340/573.1; 40/300; 40/303; 40/633; 40/634; 235/1 R; 283/70; 283/74; 283/75; 283/80; 340/531; 340/573.3; 340/573.4; 340/568.1

[58] Field of Search .............................. 340/573.1, 573.3, 340/573.4, 568.1, 531, 533, 539, 825.3, 825.34; 379/37, 457; 40/303, 300, 633, 634; 235/1 R; 283/70, 74, 75, 80, 81

[56] References Cited

U.S. PATENT DOCUMENTS

| | | |
|---|---|---|
| 4,059,912 | 11/1977 | Noah .......................................... 40/638 |
| 4,271,352 | 6/1981 | Thomas .................................... 235/375 |
| 4,650,219 | 3/1987 | Sigman ..................................... 283/70 |
| 5,036,610 | 8/1991 | Fehr .......................................... 40/300 |
| 5,129,614 | 7/1992 | Kohl ....................................... 248/309.2 |
| 5,163,711 | 11/1992 | Philips et al. ........................... 283/101 |
| 5,180,192 | 1/1993 | Herbert ................................... 283/101 |
| 5,515,033 | 5/1996 | Matarazzo ............................ 340/573.3 |
| 5,570,081 | 10/1996 | Holstrum .............................. 340/573.3 |

Primary Examiner—Glen Swann
Attorney, Agent, or Firm—Delbert J. Barnard

[57] ABSTRACT

A method for relating information about an article to a finder of that object, person, or animal including providing an identification device proximate the article. Providing the identification device with a telephone number, code, and instruction for a finder of the article to call the telephone number. Using the telephone number to link the finder to a clearing house. The clearing house prompt the finder to enter the code. Using the code, the clearing house accesses information about the article and forwards the call to the proper recipient of the call.

10 Claims, 3 Drawing Sheets

METHOD FOR RELATING INFORMATION ABOUT AN ARTICLE TO A FINDER OF THE ARTICLE

TECHNICAL FIELD

This invention relates to a method for relating information about an article to a finder of the article. The article may be an object, a person, or an animal. More particularly, this invention relates to a method for relating information about an article to the finder of the article without disclosing to the finder the identity of the owner, parent, or guardian of the article.

BACKGROUND OF THE INVENTION often, a person will label his articles with identification tags listing his name and address in hopes that if he loses one of his articles, a finder of the article will return it to him. Unfortunately, in some situations, the name and/or address on the identification tag could motivate the finder to exploit return of the article for the payment of money.

SUMMARY OF THE INVENTION

The present invention provides a method for relating information about an article to a finder of the article. The method comprises providing an identification device proximate the article. The identification device includes a telephone number an d a code. The method further includes providing a clearing house which may be accessed by the finder by calling the telephone number on the identification device. The method includes prompting the finder to call the telephone number by reference to the identification device. The method further includes connecting the finder to th e clearing house by the finder placing a call by dialing the telephone number displayed on the identification device. The method further includes the clearing house prompting the finder for the code displayed on the identification device and the finder providing the code to the clearing house. Then, the clearing house forwards the call from the finder to at least one the following: the owner of the article, the guardian of the article, or a source for providing emergency information about the article to the finder. The article may be either an object, a person, or an animal.

Preferably, the information about the article is provided to the finder without disclosing the name or address of the guardian or owner of the article. Additionally, the clearing house could be equipped to detect the telephone number from which the call was placed. However, the clearing house may provide information to the finder about a reward for the safe return of the article.

In another form of the invention, the clearing house detects from the code that the article is a child. Then, the clearing house notifies authorities about the call. The clearing house may also be equipped to detect the telephone number from which the call was placed and supply this to the authorities.

In another form of the invention, the clearing house may detect from the code that the article is a person. The clearing house may then provide the finder with the option of obtaining emergency medical information about the person.

The telephone call to the clearing house may be a toll-free call optionally, the telephone call to the clearing house may be paid for by phone time pre-paid for by the owner or guardian of the article.

In a preferred form of the invention, the clearing house incorporates a platform switch. The platform switch is equipped to answer and route calls.

In another form of the invention, the clearing house takes a message from the finder if the call is not answered when forwarded. The clearing house would then notify the guardian or owner of the message from the finder.

These and other aspects, features, and advantages of the present invention will become apparent from the following description of the best modes for carrying out the invention, when read in conjunction with the drawings, and claims, all of which are incorporated herein as part of the disclosure of the invention.

BRIEF DESCRIPTION OF THE DRAWINGS

Like reference numerals are used to denote like parts throughout the several figures of the drawings, and.

BEST MODES FOR CARRYING OUT THE INVENTION

The present invention provides a method for relating information about an article to the finder of the article. The article may be an object, a person, or a pet. The method of the present invention permits the return of a lost article to its owner by providing information about the article to a finder without jeopardizing the safe return of the article by disclosing more information than needed to the finder. Additionally, the present invention provides a method for providing vital information about a person or animal to a finder who finds the person or animal in a distressed situation.

Figure 1:
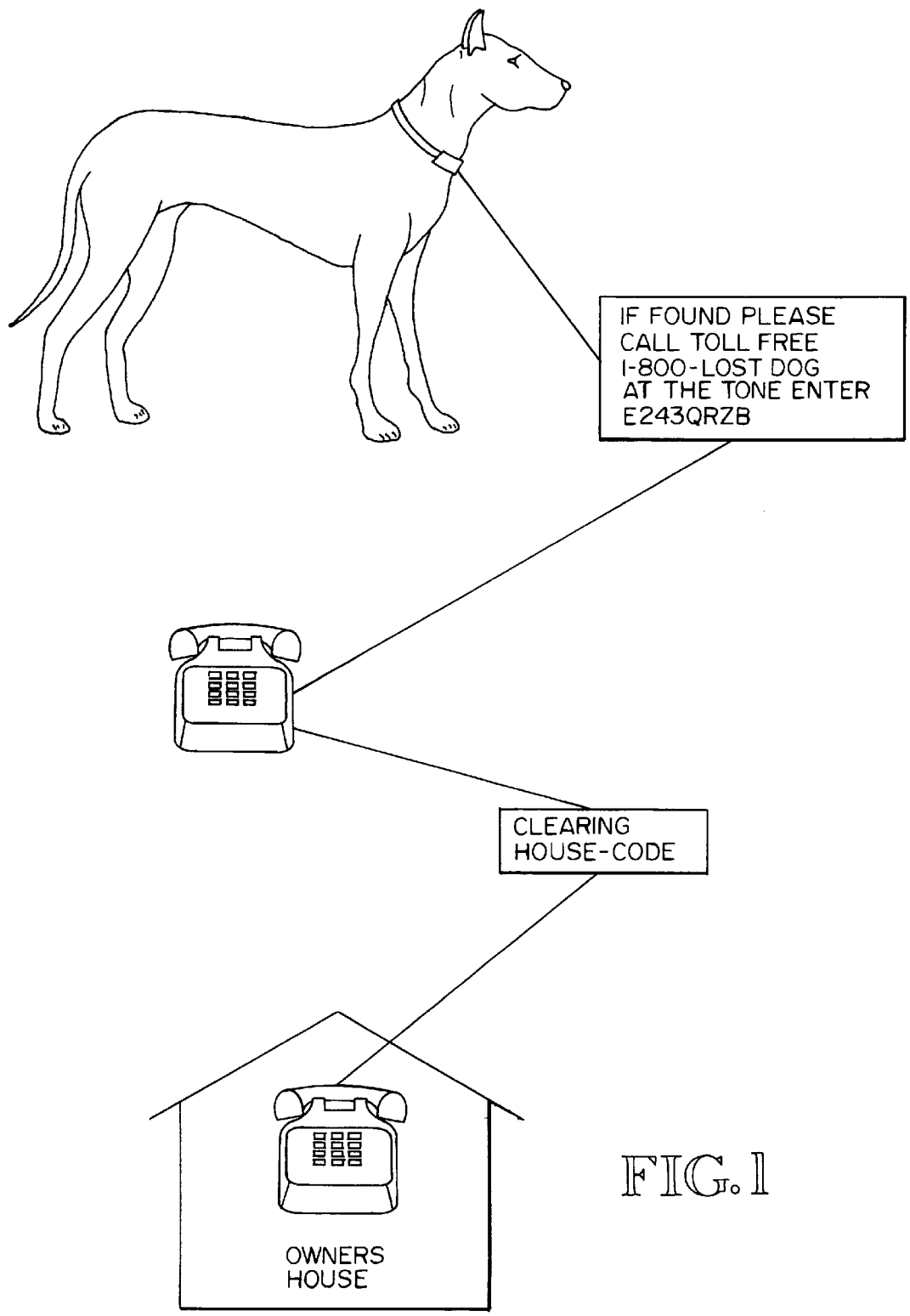
FIG. 1 is a schematic diagram illustrating an embodiment of the present invention.

Referring first to FIG. 1, the method of the present invention is illustrated for use on an article such as a pet 10. An identification device 12 is attached to the pet's collar 14. The identification device includes a telephone number 16 and a primary code 18. Upon a finder finding the pet 10, the finder could view the identification device 12 which includes information to prompt the finder to call the telephone number 16 and enter the code 18. The finder could then place a telephone call 18 to the telephone number 16 which would connect the finder to a clearing house 20. The clearing house would prompt the finder for the code 18. The clearing house 20 would determine the telephone number of the owner of the pet 10 by cross referencing the code 18 in a database. Then, the clearing house would forward the call 22 to the owner's phone 24 without disclosing the identification or address of the owner to the finder. When the call 22 was forwarded to the owner's phone 24, the finder could speak directly with the owner to plan a quick and safe return of the pet 10 to the owner.

If the owner of the article illustrated in FIG. 1 became aware that the article, such as the pet 10 or a child was missing, the owner could notify the clearing house 20 of the missing article. The clearing house 20 could then be alerted for any calls on such article and take precautions if any calls come in regarding such articles. For example, the clearing house 20 could trace such calls at the owner's request.

If the owner's phone was not answered, the finder could leave a message for the owner with the clearing house 20. Preferably, the clearing house 20 would then notify the owner of the message. In a preferred form of the invention, the clearing house 20 would call the owner's phone 24 every few minutes with the messages. For example, the clearing house could call the owner's phone 24 every 15 minutes until the message was delivered.

This method illustrated in FIG. 1 would be equally useful on objects such as a suitcase, car keys, or a lap-top computer.

Figure 2:
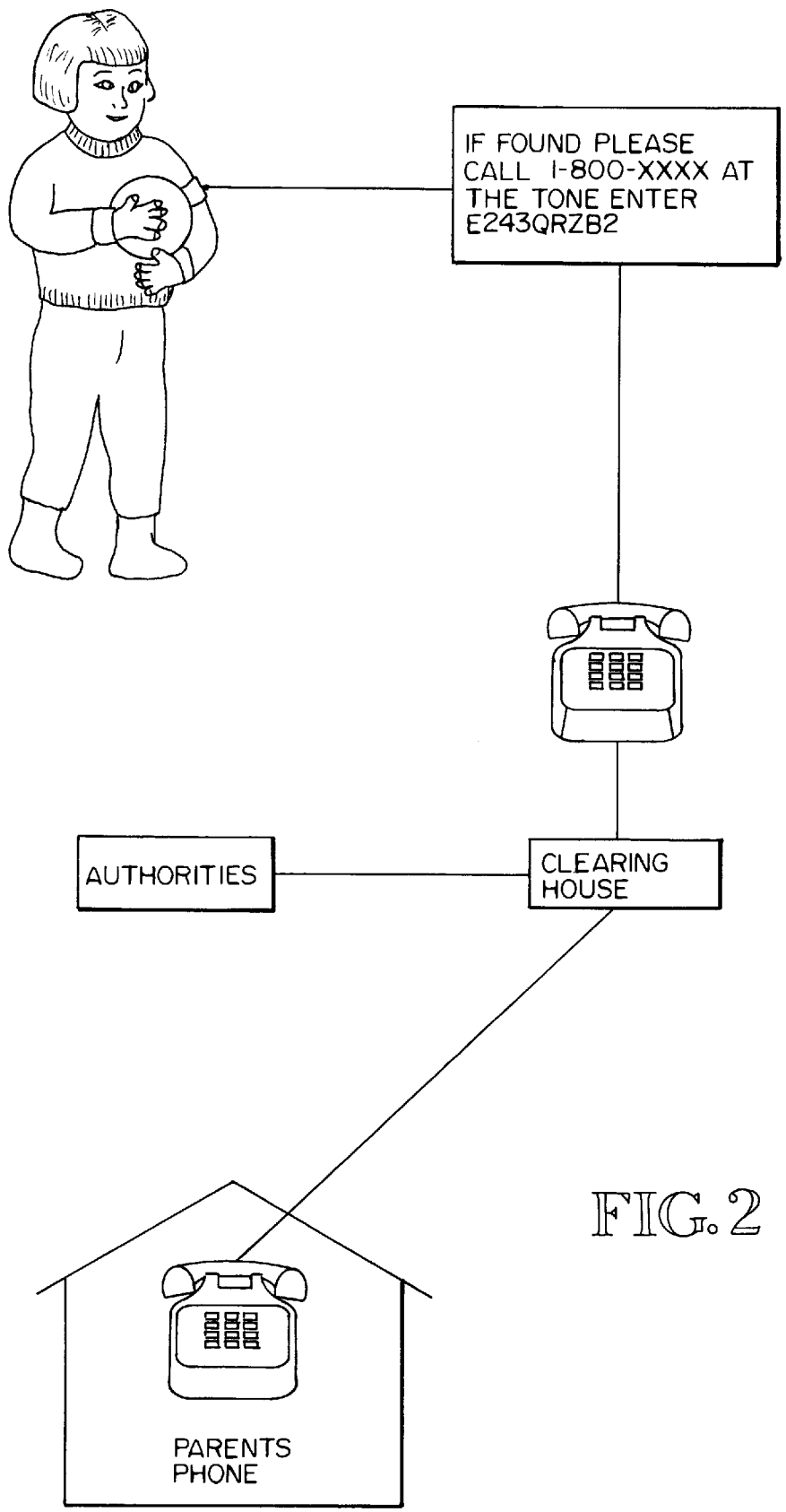
FIG. 2 is a schematic diagram illustrating another embodiment of the present invention.

Another embodiment of the present invention is illustrated in FIG. 2. In this embodiment of the invention, the article is a child 26. The identification device 12 is attached to the child 26. Upon a finder finding the child 26, the finder could view the identification device 12 which includes the telephone number 16 and code 18'. The finder could then make a telephone call 22 to the telephone number 16 listed on the identification device 12 which would connect the finder to the clearing house 20. The clearing house 20 would prompt the finder for the code 18'. From the code 18', the telephone number of the parents could be determined by cross reference to a database at the clearing house 20. The clearing house 20 would then connect the finder's call 22 to the parent's phone 28 without disclosing to the finder the identity or address of the parents or the child 26. The parents and the finder could then arrange for a safe and quick return of the child 26 to the parents. If the parent's phone 28 was not answered, the finder could leave a message with the clearing house 20. As described above, the clearing house 20 could then notify the parents of the call. Optionally, the clearing house could also cross reference from the code 18' that the missing article is a child 26 and notify authorities 30 about the call 22. Additionally, the clearing house 20 could be equipped to detect the telephone number from which the call 22 was placed and notify the authorities 30 of that telephone number.

The method illustrated in FIG. 2 would also be useful on an infirm adult, such as an adult suffering from Alzheimer's, who could easily become disoriented.

Figure 3:
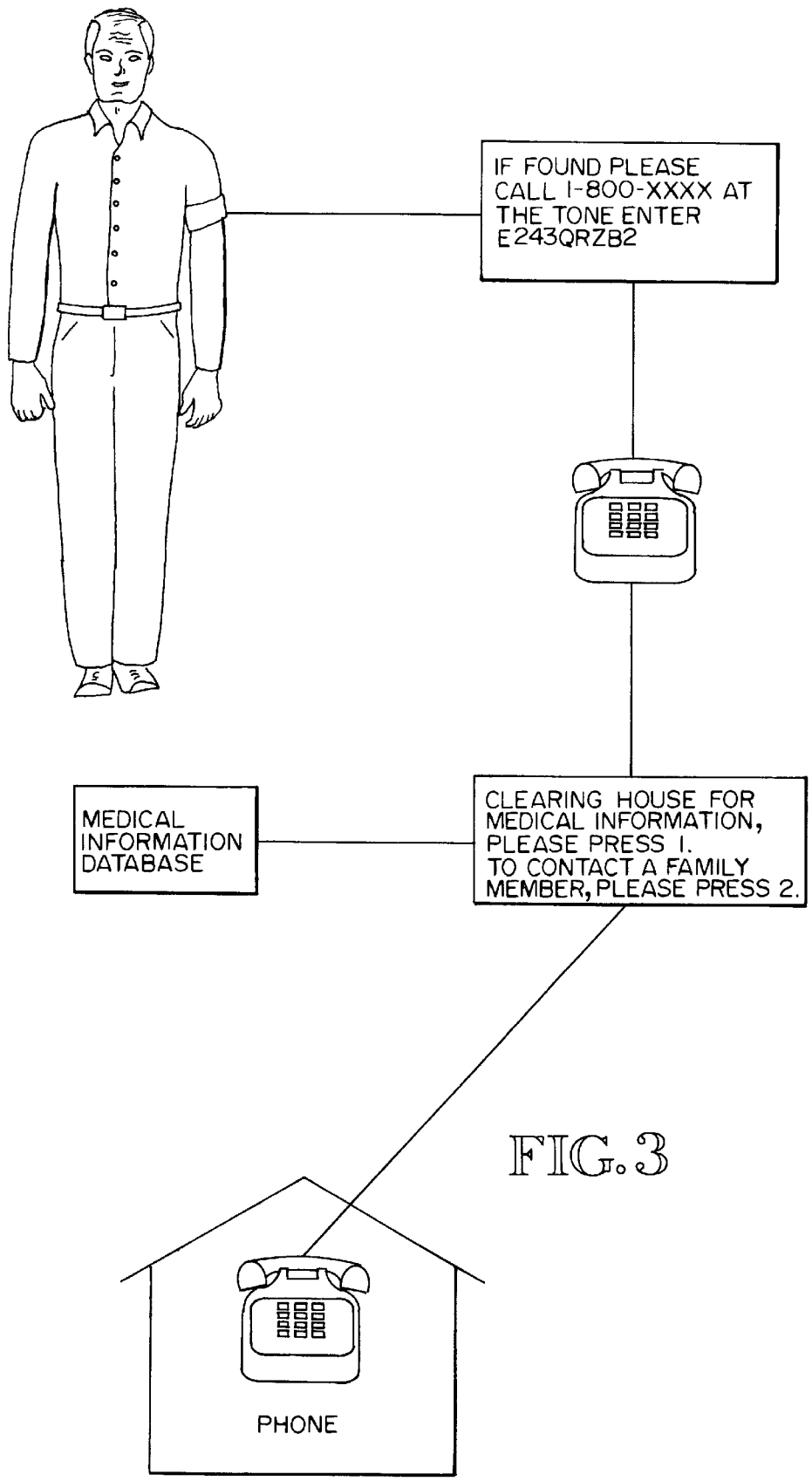
FIG. 3 is a schematic diagram illustrating yet another embodiment of the present invention.

FIG. 3 illustrates an additional embodiment of the invention. In this embodiment of the invention, the identification device 12 is placed on a person 32. If the person 32 were found by a finder in a condition unable to respond to the finder, for example if the person 32 had been injured in an accident, the finder could read the identification device 12 and be prompted to make a telephone call 22 to the telephone number 16 printed on the device 12. Upon making the telephone call 22, the finder would be linked to a clearing house which would prompt the finder to enter a code 18" on the device 12. The clearing house would then prompt the finder as to whether the finder was interested in obtaining emergency medical information about the person 32 or contacting a family member. If the finder chose to obtain medical information about the person 32, the call 22 would be linked to a medical information database 34 which would provide information, such as medical history and drug allergies. If the finder wished to contact a family member, the call 22 would be forwarded to the family member's phone. The finder could then relate the state or condition of the person 32 to a family member. In both of these instances, the call 22 could be forwarded and the necessary information obtained about the person 32 without disclosing the identity or address of the person unless this information became necessary to the finder.

If the family member did not answer the call 22, the finder could leave a message with the clearing house 20. Then, the clearing house 20 could notify the family member.

This embodiment of the present invention illustrated in FIG. 3 would be equally useful on a child, infirm adult, or an animal. The method illustrated in FIG. 3 could be combined with the method of FIG. 2, so that a finder could obtain medical information about lost or disoriented child, infirm adult or animal as well as plan for the safe return of the child, adult or animal.

It is envisioned that a person could use the method of the present invention by becoming a registered member of an organization which maintains and operates the clearing house 20. Upon registration, the member would obtain a unique primary code 18 and identification devices 12 including the code 18. These identification devices 12 could take any form which would be connectable to or on an article and readily viewable by a finder. For example, the identification devices 12 could take the form of tags, stickers, decals, stamps, or cards. Additionally, the identification devices could be incorporated into pet collars, luggage hardware, or jewelry.

It is also envisioned that a registered member could obtain variations of his primary code 18 for use on specific articles. For example, if the member had a child, the child's identification device 20 could include a specific code 18', still linking the child to the member, but also indicating to the clearing house that this code 18' is used on a child, and not a suitcase or set of keys.

Finally, it is envisioned that the registered member could obtain a tertiary code 18" for placement on the device 12. The device would indicate to a finder to call the telephone number 16 in case of a medical emergency. When the code 18" is received by the clearing house 20, the clearing house would cross reference the code 18" with a database and determine that the article is a person 32 and prompt the finder for medical information or connection to a family member.

Preferably, the telephone number 16 to the clearing house 20 would be a toll free call. Additionally, it is preferred that the clearing house 20 be operated to answer telephone calls twenty-four (24) hours a day, each and every day. In another form of the invention, the registered member could obtain pre-paid phone time which would be accessed by the finder when the code was entered. Then, the call would be debited against the phone time pre-paid for by the member.

The member could customize the information provided to a finder when a call was received by the clearing house 20. For example, the information could be customized to include notification of a reward to the finder for the safe return of the article.

In another form of the invention, the clearing house 20 could be in the form of a platform switch. The platform switch would prompt the finder for information and route the call to the appropriate recipient.

It is to be understood that many variations in the operation can be made to the illustrated and above-described embodiments without departing from the spirit and scope of the present invention. Some of the features of the preferred embodiments may be utilized without other features. Therefore, it is to be understood that the presently described and illustrated embodiments are non-limitive and are for illustration only. Instead, my patent is to be limited for this invention only by the following claim or claims interpreted according to accepted doctrines of claim interpretation, including the doctrine of equivalents and reversal of parts.

What is claimed is:

1. A method for relating information about a child to a finder of said child, comprising:

providing an identification device proximate to said child, said identification device including a telephone number and a code;

providing a clearing house which may be accessed by the finder by calling the telephone number on the identification device;

prompting said finder to call said telephone number by reference to the identification device;

connecting said finder to said clearing house by said finder placing a call by dialing the telephone number displayed on the identification device;

said clearing house prompting said finder for the code displayed on the identification device;

said finder providing the code to the clearing house;

said clearing house detecting from said code that a child has been found; and said clearing house notifying authorities of the call.

2. The method of claim 1, further including said clearing house detecting the telephone number from which the call was placed; and providing the telephone number from which the call was placed to the authorities.

3. A method for relating information about an article to a finder of said article, comprising:

providing an identification device proximate to said article, said identification device including a telephone number and a code;

providing a clearing house which may be accessed by the finder by calling the telephone number on the identification device;

prompting said finder to call said telephone number by reference to the identification device;

connecting said finder to said clearing house by said finder placing a call by dialing the telephone number displayed on the identification device;

said clearing house prompting said finder for the code displayed on the identification device;

said finder providing the code to the clearing house;

said clearing house detecting from the code information about the article and forwarding said call from said finder to at least one of the following: owner of the article, guardian of the article, or a source for providing emergency information about the article to the finder;

further including said clearing house detecting the telephone number from which the call was placed; and providing the telephone number from which the call was placed to the owner, parent or guardian of the article.

4. A method for relating information about a person to a finder of said person, comprising:

providing an identification device proximate to said person, said identification device including a telephone number and a code; prompting said finder to call said telephone number by reference to the identification device;

connecting said finder to said clearing house by said finder placing a call by dialing the telephone number displayed on the identification device;

said clearing house prompting said finder for the code displayed on the identification device;

said finder providing the code to the clearing house;

said clearing house detecting from said code the identity of the person; and said clearing house providing emergency medical information about said person to said finder.

5. A method for relating information about an article to a finder of said article, comprising:

providing an identification device proximate to said article, said identification device including a telephone number and a code;

prompting said finder to call said telephone number by reference to the identification device;

connecting said finder to said clearing house by said finder placing a call by dialing the telephone number displayed on the identification device;

said clearing house prompting said finder for the code displayed on the identification device;

said finder providing the code to the clearing house;

said clearing house detecting from the code information about the article and forwarding said call from said finder to at least one of the following: owner of the article, guardian of the article, or a source for providing emergency information about the article to the finder; and wherein said clearing house incorporates a platform switch for answering and routing said call.

6. The method of claim 5, wherein said identification device is a tag.

7. The method of claim 5, wherein said telephone call to said clearing house is a toll-free call.

8. The method of claim 5, wherein said telephone call to said clearing house is paid for by pre-paid phone time.

9. The method of claim 5, further including said clearing house providing information to the finder about a reward for the safe return of the article.

10. The method of claim 5 further including said clearing house taking a message from the finder if the call was not answered when forwarded; and said clearing house notifying said owner or guardian of said message from said finder.

* * * * *